United States Patent [19]
Nonaka

[11] Patent Number: 5,184,168
[45] Date of Patent: Feb. 2, 1993

[54] DISTANCE MEASURING APPARATUS FOR CAMERA, WHICH CONTROLS OUTPUTS FROM MULTI-ELECTRODES PSD

[75] Inventor: Osamu Nonaka, Sagamihara, Japan

[73] Assignee: Olympus Optical Co., Ltd., Tokyo, Japan

[21] Appl. No.: 757,970

[22] Filed: Sep. 12, 1991

[30] Foreign Application Priority Data

Sep. 26, 1990 [JP] Japan .................................. 2-257908
Jul. 31, 1991 [JP] Japan .................................. 3-216123

[51] Int. Cl.⁵ ...................... G03B 13/36; G01C 3/08
[52] U.S. Cl. ........................................ 354/403; 356/1
[58] Field of Search .................... 354/403; 356/1, 4; 250/201.4, 201.6

[56] References Cited

U.S. PATENT DOCUMENTS 4,615,616 10/1986 Shiomi ............................ 354/403 X
4,849,781 7/1989 Nakazawa et al. ................. 354/403

FOREIGN PATENT DOCUMENTS 58-9013 1/1983 Japan .

Primary Examiner—W. B. Perkey
Attorney, Agent, or Firm—Frishauf, Holtz, Goodman & Woodward

[57] ABSTRACT

A distance measuring apparatus for a camera includes a light-emitting element array having a plurality of light-emitting elements, and an optical position detection element having a plurality of electrodes. The distance measuring apparatus selects two of the plurality of electrodes of the optical position detection element. The apparatus further includes a plurality of preamplifiers respectively connected to the plurality of electrodes, a control unit for performing high-impedance control, low-impedance absorption control, and low-impedance amplification control of the plurality of preamplifiers in accordance with the selected and nonselected states of the plurality of electrodes, and an arithmetic unit for calculating an object distance in accordance with a preamplifier output subjected to the low-impedance amplification control.

15 Claims, 8 Drawing Sheets

F I G. 3A (LEFT) 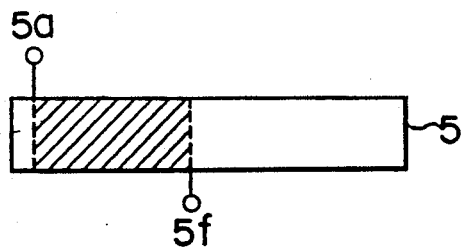
F I G. 3B (CENTER) 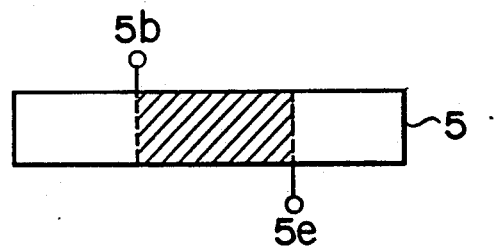
F I G. 3C (RIGHT) 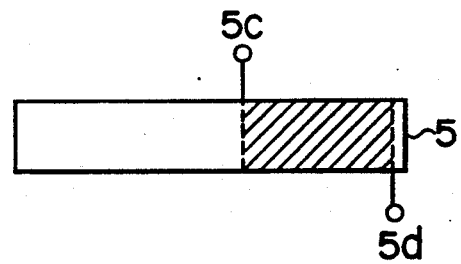
F I G. 3D (CENTER: FAR-DISTANCE) 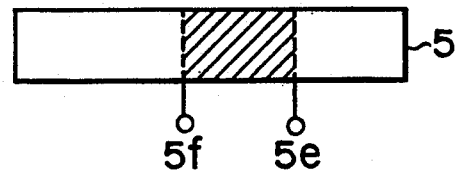
F I G. 3E (HIGH-BRIGHTNESS: NEAR-DISTANCE) 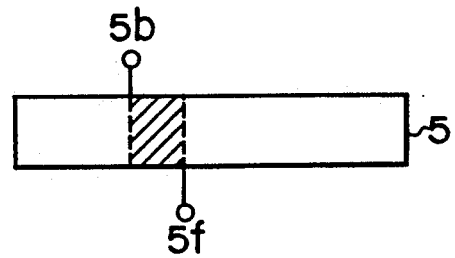
F I G. 3F (CENTER: MACRO) 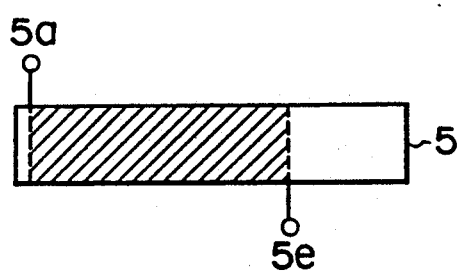

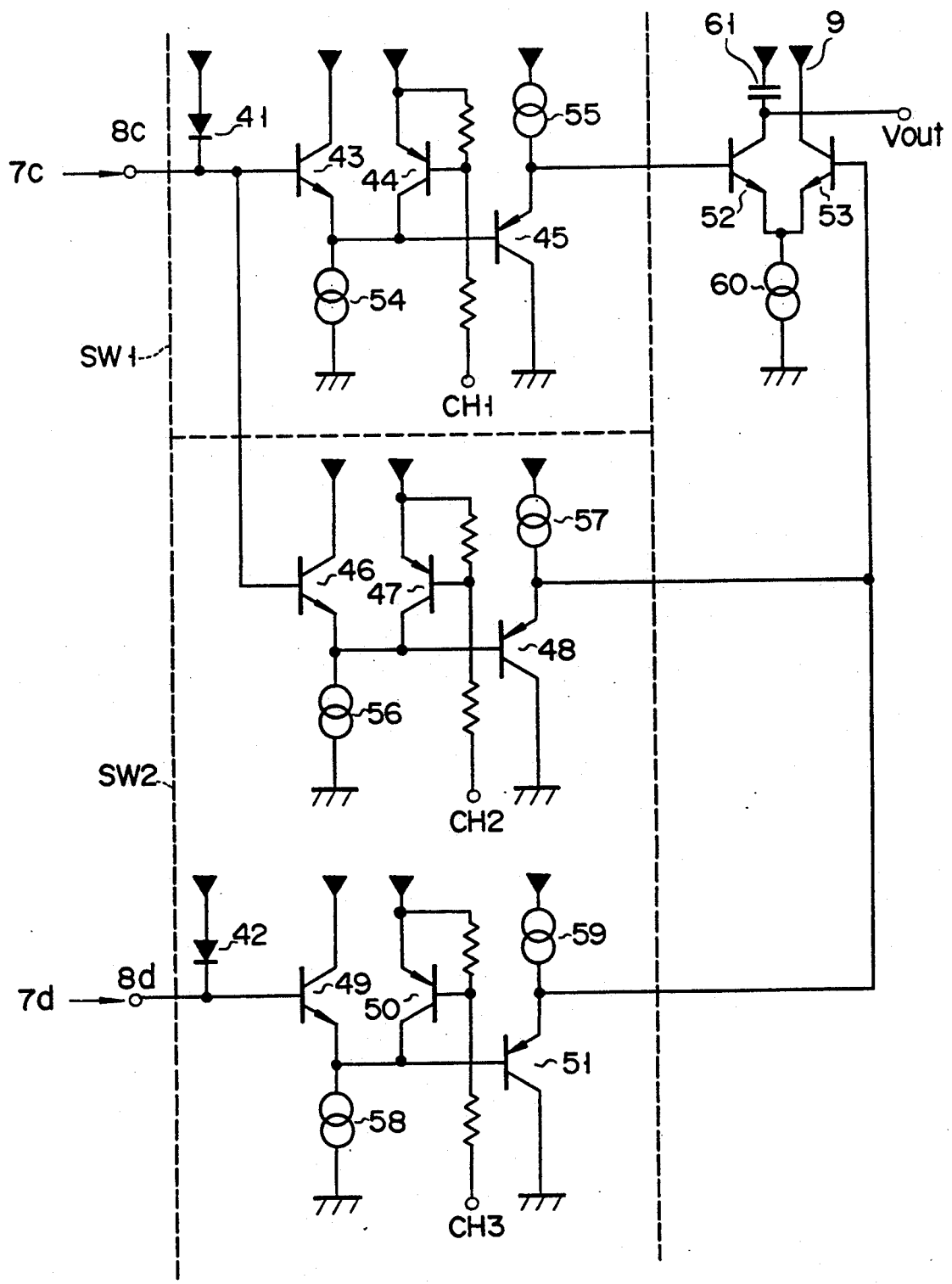
F I G. 5

DISTANCE MEASURING APPARATUS FOR CAMERA, WHICH CONTROLS OUTPUTS FROM MULTI-ELECTRODES PSD

BACKGROUND OF THE INVENTION

1. Field of the Invention

The present invention generally relates to a distance measuring apparatus for a camera and, particularly, to a multi-point distance measuring apparatus used in focus detection or the like of a camera, and, more particularly, to a multi-point distance measuring apparatus using a so-called active trigonometrical distance measuring scheme.

2. Description of the Related Art

An apparatus using a so-called active trigonometric distance measuring scheme is known as a conventional distance measuring apparatus for measuring (to be referred to as distance measurement hereinafter) a distance from a camera to an object (to be referred to as an object distance hereinafter). This conventional distance measuring apparatus is used for focus detection or the like of a camera.

A multi-point distance measuring apparatus for performing distance measurement at a plurality of points within a photographic frame is also known (e.g., Published Unexamined Japanese Patent Application No. 58-9013). By using this multi-point distance measuring apparatus, distance measurement of an object except for a target object can be prevented. For example, an in-focus state of an object except for a principal object can be prevented in focus detection of a camera.

A multi-point distance measuring apparatus using an active trigonometric distance measuring scheme will be described below.

The active trigonometric distance measuring scheme will be described first. For the sake of descriptive simplicity, an optical system for performing distance measurement of only one point within a photographic frame will be exemplified.

FIG. 7 is a view showing an arrangement of a distance measurement optical system using this active trigonometric distance measurement scheme. Referring to FIG. 7, reference numeral 1 denotes an IRED (Infrared-Emitting Diode) for intermittently emitting infrared rays; 2, a projection lens for guiding infrared rays emitted from the IRED 1 to an object O; 3, a light-receiving lens for focusing the infrared rays reflected by the object O; and 4, a so-called PSD (Position Sensitive Device) as a kind of a semiconductor optical element for receiving the infrared rays focused by the light-receiving lens 3 and outputting two different currents corresponding to light-receiving positions.

With the above arrangement, when the IRED 1 is operated to emit infrared rays, some of the emitted infrared rays are projected on the object O through the projection lens 2. Some of the infrared rays projected on the object O are reflected by the object O and are focused on the surface of the PSD 4 by the light-receiving lens 3.

A focusing position x on the surface of the PSD 4 is defined as follows:

$$x = \frac{S \cdot f}{l} \tag{1}$$

where S is the distance (baseline length) between the principal points of the projection lens 2 and the light-receiving lens 3, f is the focal length of the light-receiving lens 3, and l is the object distance.

The start point of the focusing position x is an intersection between the PSD 4 and a line parallel to a line which passes through the principal point of the light-receiving lens 3 and which is obtained by connecting the emission center of the IRED 1 and the principal point of the projection lens 2.

Of the two different currents output from the PSD 4, when one current component (i.e., a component except for the other current component caused by a sunbeam and illumination light) generated by the infrared rays emitted from the IRED 1, reflected by the object O, and reaching the PSD 4, and the other current component are defined as $I_1$ and $I_2$, respectively, these signal currents $I_1$ and $I_2$ can be expressed as a function of the focusing position x a follows:

$$I_1 = \frac{a + x}{t_p} \cdot I_{p\phi} \tag{2}$$

$$I_2 = \frac{t_p - (a + x)}{t_p} \cdot I_{p\phi} \tag{3}$$

where $I_{p\phi}$ is the total signal photocurrent, $t_p$ is the overall length of the PSD 4, and a is the distance between the start point of the focusing position x and an end portion of the PSD 4 on the IRED 1 side.

The following equation is derived from equations (1) to (3):

$$\frac{I_1}{I_1 + I_2} = \frac{a + x}{t_p} = \frac{1}{t_p}\left(a + \frac{S \cdot f}{l}\right) \tag{4}$$

Equation (4) can be further rewritten as follows:

$$\frac{1}{l} = \left\{ t_p \left( \frac{I_1}{I_1 + I_2} \right) - a \right\} \cdot \frac{1}{S \cdot f} \tag{5}$$

By using equation (5), the distance l to the object O can be calculated by using the signal currents $I_1$ and $I_2$. Equation (5) can be established by correcting a even if the position of the IRED 1 is not aligned with the optical axis of the projection lens 2.

A multi-point distance measuring apparatus using this active trigonometric distance measuring scheme will be described below. FIG. 8 is a view showing the principle of this multi-point distance measuring apparatus. Referring to FIG. 8, reference numerals 1a, 1b, and 1c denote IREDs; 2, a projection lens; and 3, a light-receiving lens; and 4a, 4b, and 4c, PSDs. Reference symbols Oa, Ob, and Oc denote objects as distance measurement target objects.

With the above arrangement, the IREDs 1a, 1b, and 1c are sequentially turned on. When the IRED 1a is turned on to emit infrared rays, signal currents output from the PSD 4a are read to perform calculations according to equation (5), thereby obtaining a distance to the object Oa. When the IRED 1b is turned on to emit infrared rays, signal currents output from the PSD 4b are read to perform calculations according to equation (5), thereby obtaining a distance to the object Ob. Similarly, when the IRED 1c is turned on to emit infrared rays, signal currents output from the PSD 4c are read to perform calculations according to equation (5), thereby obtaining a distance to the object Oc.

As described above, since equation (5) is established by properly selecting a in equation (5) even if the positions of the IREDs 1a, 1b, and 1c are not aligned on the optical axis of the projection lens 2, distance measurement (multi-point distance measurement) of a plurality of objects can be performed.

The arrangement shown in FIG. 8 uses the three IREDs 1a, 1b, and 1c as light-emitting means. However, as disclosed in the technique of Published Unexamined Japanese Patent Application No. 58-9013, one IRED may be moved to emit infrared lights at different positions.

The PSD may comprise a split type optical position detection element. In either case, multi-point distance measurement can be performed in accordance with the same principle as that of the multi-point distance measuring apparatus shown in FIG. 8.

In this multi-point distance measuring apparatus, if the size of a spot of each of infrared rays emitted from the IREDs 1a, 1b, and 1c is set to be ideally small to be a point, and each of the PSDs 4a, 4b, and 4c can receive light up to its farthest end, a minimum value (nearest distance measuring limit) $l_{MIN}$ (FIG. 7) of a measurable object distance is defined as follows:

$$l_{MIN} = \frac{S \cdot f}{t_p - a} \quad (6)$$

As is apparent from equation (6), the nearest distance measuring limit $l_{MIN}$ is decreased as the overall length $t_p$ of each of the PSDs 4a, 4b, and 4c is increased. In other words, the nearest limit of the measurable object distance is reduced (i.e., the distance measuring precision is improved) as the overall length $t_p$ of each of the PSDs 4a, 4b, and 4c is increased.

When the overall length $t_p$ of each of the PSDs 4a, 4b, and 4c is increased, the pitch (element interval) between the PSDs 4a, 4b, and 4c is increased. For this reason, a multi-point measurable range $\theta$ (FIG. 8) has a larger minimum value, thus posing a problem.

More specifically, in order to reduce the minimum value of the measurable range $\theta$ (i.e., in order to allow multi-point distance measurement when intervals $L_1$ and $L_2$ between the objects Oa, Ob, and Oc are small), the pitch of the PSDs 4a, 4b, and 4c must be reduced. Therefore, the overall length $t_p$ of each of the PSDs 4a, 4b, and 4c must be reduced.

For example, assume that the focal lengths of the projection lens 2 and the light-receiving lens 3 are equal to each other. In order to set the minimum value of the measurable range $\theta$ to be a general value, i.e., 6°, the pitch of the PSDs 4a, 4b, and 4c must be set to be 1.5 mm for a focal length of 14 mm.

The overall length $t_p$ of each of the PSDs 4a, 4b, and 4c must then be set to be 1.5 mm or less, and therefore the nearest measurable limit $l_{MIN}$ cannot be sufficiently reduced.

In order to solve the above problem, PSDs 4a, 4b, and 4c may be disposed stepwise (oblique arrangement), as shown in FIG. 9. When the PSDs are disposed stepwise, IREDs 1a, 1b, and 1c are disposed stepwise in accordance with the oblique arrangement of the PSDs 4a, 4b, and 4c. This arrangement tends to cause that measurement positions become asymmetry at the right and left sides.

When PSDs 4a, 4b, and 4c are to be monolithically arranged, the element area is increased to cause high cost.

SUMMARY OF THE INVENTION

It is, therefore, an object of the present invention to provide a new and improved distance measuring apparatus for a camera, in which an area of an element such as a PSD is decreased, a nearest limit of an object distance and a minimum value of a measurable range are sufficiently small, and high-precision distance measurement can be performed.

According to one aspect of the present invention, there is provided a distance measuring apparatus for a camera, comprising:

light-emitting means having an array of a first light-emitting element for emitting light onto almost the center of an object to be photographed, a second light-emitting element for emitting light to the right side of the object, and a third light-emitting element for emitting light to the left side of the object;

a semiconductor position detection element, having a longitudinal direction aligned with that of the array of the first to third light-emitting elements, for receiving light reflected by the object upon radiation of light from each of the first to third light-emitting elements, the semiconductor position detection element being provided with first and second electrodes as left and right end electrodes, and a plurality of electrodes arranged between the first and second electrodes, the plurality of electrodes consisting of a third electrode located near the first electrode, a fourth electrode located near the second electrode, a fifth electrode located near the third electrode between the third and fourth electrodes, and a sixth electrode located near the fourth electrode between the third and fourth electrodes;

a plurality of preamplifiers, connected to the first to sixth electrodes, for selectively performing high-impedance control, low-impedance absorption control, and low-impedance amplification control;

switching control means comprising:

a) means for, when the semiconductor position detection element receives light emitted from the first light-emitting element and reflected by the object, performing the low-impedance amplification control of the preamplifiers connected to the third and fourth electrodes, the high-impedance control of the preamplifiers connected to the fifth and sixth electrodes, and the low-impedance absorption control of the preamplifiers connected to the first and second electrodes, b) means for, when the semiconductor position detection element receives light emitted from the second light-emitting element and reflected by the object, performing the low-impedance amplification control of the preamplifiers connected to the second and sixth electrodes, the high-impedance control of the preamplifier connected to the fourth electrode, and the low-impedance absorption control o the preamplifiers connected to the first, third, and fifth electrodes, and c) means for, when the semiconductor position detection element receives light emitted from the third light-emitting element and reflected by the object, performing the low-impedance amplification control of the preamplifiers connected to the first and fifth electrodes, the high-impedance control of the preamplifier connected to the third electrode, and the low-impedance absorption control of the preamplifiers connected to the second, fourth, and sixth electrodes; and arithmetic means for calculating an object distance in accordance with output currents from the preamplifiers of the plurality of preamplifiers, which are subjected to the low-impedance amplification control.

In the distance measuring apparatus for a camera according to the present invention, there is employed a semiconductor position detection element having electrodes at a plurality of positions obtained by dividing a total light-receiving range of a beam reflected from an object of the light-emitting element, so that the light-receiving ranges overlap each other.

The light-receiving ranges can have a sufficiently small pitch while a sufficiently large overall length of the semiconductor position detection element is assured. Therefore, both the nearest limit of the object distance and the minimum value of the measurable range can be made sufficiently small.

The distance measuring apparatus for a camera according to the present invention has a plurality of preamplifiers. These preamplifiers perform high-impedance control for a current output from an electrode located within the selected light-receiving range and low-impedance absorption control for a current output from an electrode located outside the selected light-receiving range. In addition, the preamplifiers perform low-impedance amplification control for a current output from an electrode located at each end of the selected light-receiving range. Of these preamplifiers, a preamplifier for performing low-impedance amplification control according to the selected light-receiving range is selected, and a distance to the object is measured on the basis of an output value from this selected preamplifier, thereby improving distance measuring precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A to 3F are views showing selection states of light-receiving ranges of a PSD in FIGS. 1 and 2;

FIG. 5 is a circuit diagram showing intern connections of a switch unit and an arithmetic unit in FIG. 1;

DETAILED DESCRIPTION OF THE PREFERRED EMBODIMENTS

Figure 1:
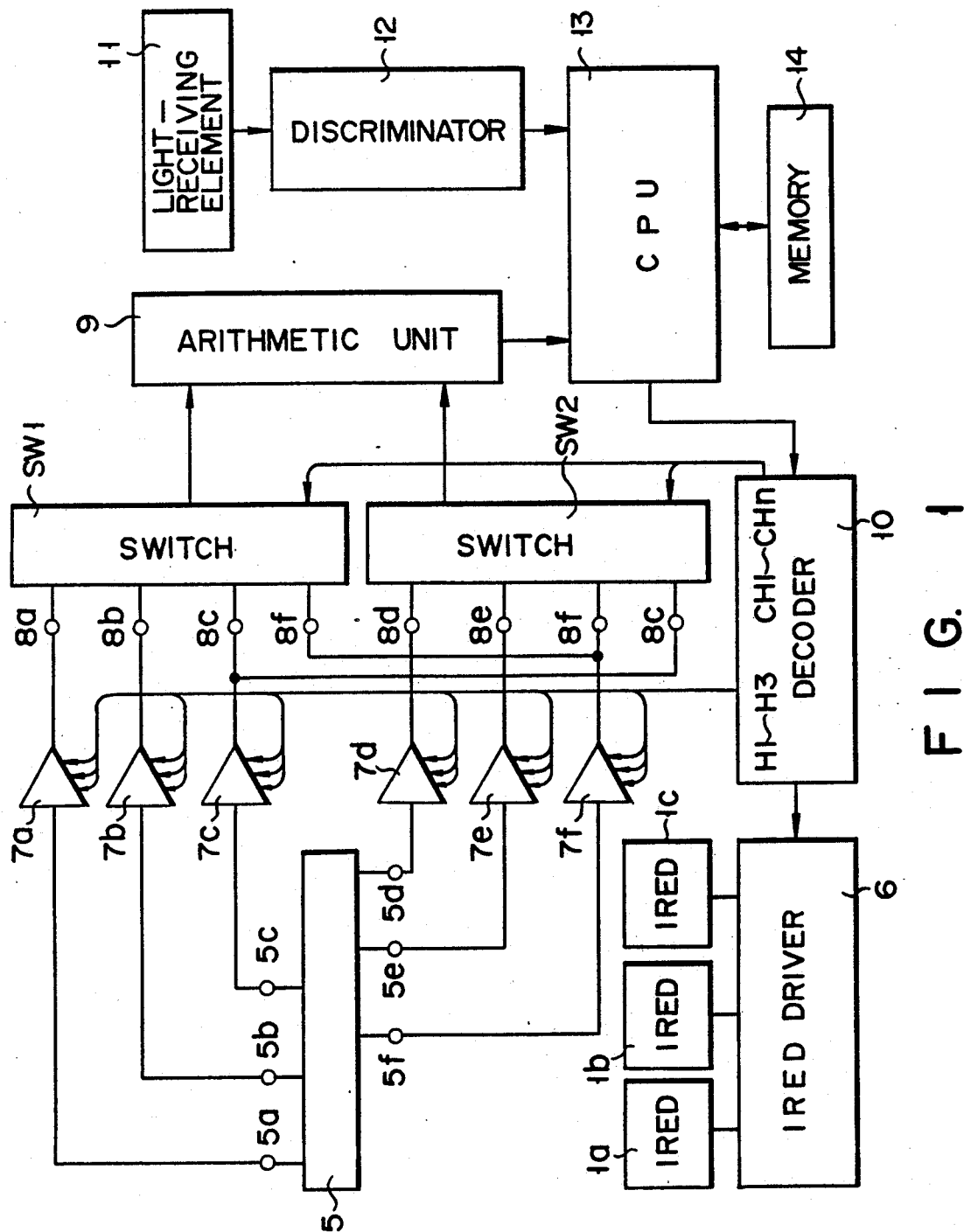
FIG. 1 is a schematic block diagram showing a multi-point distance measuring apparatus according to the first embodiment of the present invention.

Reference will now be made in detail to the presently preferred embodiments of the invention as illustrated in the accompanying drawings, in which like reference characters designate like or corresponding parts throughout the several drawings.

The first embodiment of the present invention will be described below.

Figure 2:
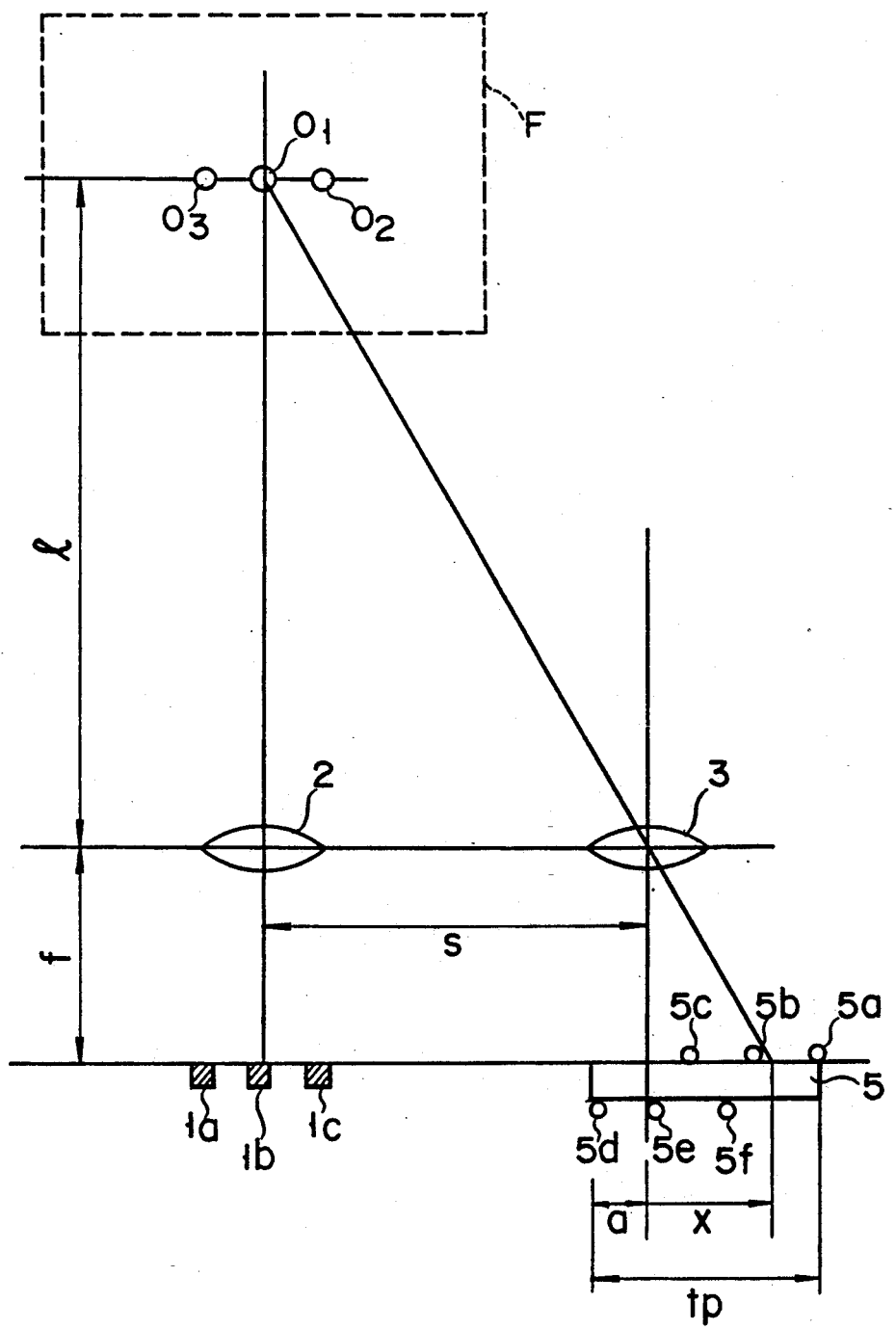
FIG. 2 is a view showing an optical system in the multi-point distance measuring apparatus shown in FIG. 1.

FIGS. 1 and 2 are a schematic block diagram and an optical diagram, respectively, showing a multi-point distance measuring apparatus according to the first embodiment of the present invention. Referring to FIG. 1, reference numerals 1a, 1b, and 1c denote infrared-emitting diodes (IREDs); and 5, an optical position detection element (PSD) having a plurality of electrodes 5a to 5f corresponding to light-receiving ranges to be selected. The IREDs 1a, 1b, and 1c and the PSD 5 are arranged as shown in FIG. 2. More specifically, the IREDs 1a, 1b, and 1c in FIG. 2 constitute a light-emitting element array having a plurality of light-emitting elements to sequentially emit a plurality of distance measuring beams to an object O. The PSD 5 comprises a semiconductor optical position detection element (PSD) having its longitudinal direction aligned with that of the light-emitting element array and located to receive light reflected by the object. The PSD 5 has a pair of main electrodes (5a and 5d) located at two end portions of the PSD and a plurality of auxiliary electrodes (5b, 5c, 5e, and 5f) equidistantly spaced apart between the pair of main electrodes. The electrodes 5a to 5f are linearly arranged on a PSD position for the PSD light-receiving surface in practice.

Reference numeral 6 in FIG. 1 denotes an IRED driver for selectively operating the IREDs 1a, 1b, and 1c; and 7a to 7f, preamplifiers arranged to perform high-impedance control, low-impedance absorption control, and low-impedance amplification control. Reference symbols SW1 and SW2 denote switches for selecting signal currents $I_1$ and $I_2$ from signals output from terminals 8a to 8f of the preamplifiers 7a to 7f. Reference numeral 9 denotes an arithmetic unit for performing predetermined arithmetic operations required to perform computation of equation (5); and 10, a decoder for designating selection by the IRED driver 6, designating outputs selected by the switches SW1 and SW2, and designating control states of the preamplifiers 7a to 7f.

Reference numeral 11 in FIG. 1 denotes a light-receiving element for measuring ordinary light; 12, a discriminator for discriminating whether the ordinary light does not exceed a high-brightness distance measuring limit; 13, a CPU (Central Processing Unit) for controlling the overall operation of the multi-point distance measuring apparatus; and 14, a memory for storing correction data used to cause the CPU 13 to calculate an object distance.

Although the multi-point distance measuring apparatus according to this embodiment has a projection lens 2 and a light-receiving lens 3, as shown in FIG. 2, these optical elements are not illustrated in FIG. 1.

With the above arrangement, a relationship between the IREDs 1a, 1b, and 1c selectively operated in accordance with respective modes (to be described later), electrodes selected by the switches SW1 and SW2, and control states selected by the preamplifiers 7a to 7f is summarized in Table 1.

TABLE 1

| Mode | IRED | SW1 | SW2 | Low Impedance Absorption | Low Impedance Amplification | High Impedance |
|---|---|---|---|---|---|---|
| Center | 1b | 8b | 8e | 7a, 7d | 7b, 7e | 7c, 7f |
| Right | 1a | 8c | 8d | 7a, 7b, 7f | 7c, 7d | 7e |
| Left | 1c | 8a | 8f | 7c, 7d, 7e | 7a, 7f | 7b |
| Center: Far-Distance | 1d | 8f | 8e | 7a, 7b, 7d | 7e, 7f | 7c |
| High-Brightness: Near-distance | 1b | 8b | 8f | 7a, 7c, 7d, 7e | 7b, 7f | |
| Center: Macro | 1b | 8a | 8e | 7d | 7a, 7e | 7b, 7c, 7f |

When distance measurement of an object $O_1$ located near the center of a frame F in FIG. 2 is to be performed (i.e., the center mode in Table 1), the IRED 1b is selected.

In this mode, the terminal 8b of the switch SW1 and the terminal 8e of the switch SW2 are selected (i.e., a range between the electrodes 5b and 5e is selected as the light-receiving range of the PSD 5, as shown in FIG. 3B).

At this time, when the input impedances of the preamplifiers 7c and 7f connected to the electrodes 5c and 5f located within the selected light-receiving range are low, signal currents partially flow in the preamplifiers 7c and 7f, and the values of the signal currents $I_1$ and $I_2$ used in the arithmetic operations of the arithmetic unit 9 are reduced. As a result, accurate arithmetic operations cannot be performed.

In order to prevent this, the input impedances of the preamplifiers 7c and 7f are set high to prevent the signal currents from flowing in the preamplifiers (high-impedance control).

When the input impedances of the preamplifiers 7a and 7d connected to the electrodes 5a and 5d located outside the selected light-receiving range are high, all currents generated by ordinary light components received between the electrodes 5a and 5b and between the electrodes 5d and 5e flow from the electrodes 5b and 5e. Therefore, the S/N ratios of the signal currents $I_1$ and $I_2$ are decreased, and accurate arithmetic operations cannot be performed.

In order to prevent this, the input impedances of the preamplifiers 7a and 7d are set low, and the currents generated by the ordinary light components are discharged to ground (low-impedance absorption control).

All the currents generated by the ordinary light components received between the electrodes 5a and 5b and between the electrodes 5d and 5e cannot be entirely discharged even if the low-impedance absorption control is performed in the preamplifiers 7a and 7d. Some current components flow out from the electrodes 5b and 5e.

For example, when the amount of ordinary light is uniform on the entire light-receiving surface of the PSD 5, the halves of the currents generated by the ordinary light components received between the electrodes 5a and 5b and between the electrodes 5d and 5e flow out from the electrodes 5b and 5e.

In order to prevent this, additional electrodes may be arranged outside the electrodes 5b and 5e to extract the currents generated by the ordinary light. It is also effective to minimize the area of the entire light-receiving surface of the PSD 5.

When distance measurement of objects $O_2$ and $O_3$ located on the right and left sides of the center of the frame F shown in FIG. 2 is performed (i.e., the "right" mode and the "left" mode in Table 1), IREDs to be turned on, output terminals to be selected by the switches SW1 and SW2, and the preamplifiers 7a to 7f are controlled as shown in Table 1 (FIGS. 3C and 3A).

The "center:far-distance" mode is a mode used when a distance to an object subjected to distance measurement is long.

When distance measurement is to be performed using an active trigonometric distance measuring scheme, when the distance to the object is long as in this mode, the amount of reflected signal light is reduced. Therefore, the S/N ratio is decreased, and distance measuring precision is degraded.

In order to prevent this, the overall length $t_p$ of the PSD 5 (i.e., the overall length of the selected light-receiving range) may be reduced.

As can be apparent from equation (4), when the overall length $t_p$ is decreased, the rate of change in $I_1/(I_1+I_2)$ with respect to a change in $1/l$ is increased, and the resolution is increased. When the overall length $t_p$ is decreased, the current generated by the ordinary light can be reduced, thereby further increasing the S/N ratio.

Figure 6:
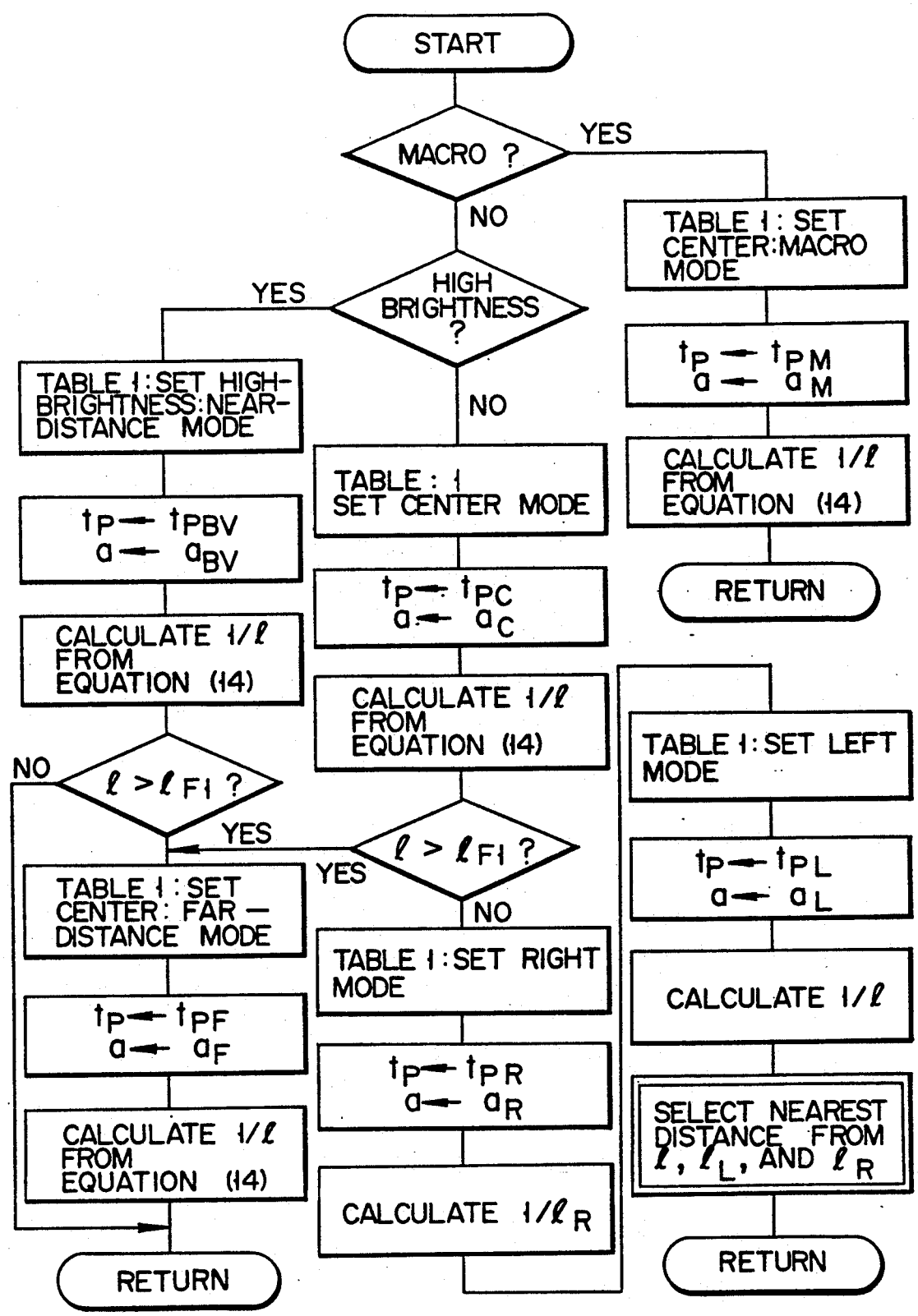
FIG. 6 is a flow chart showing an operation sequence of each part in FIGS. 1 and 2.
Figure 7:
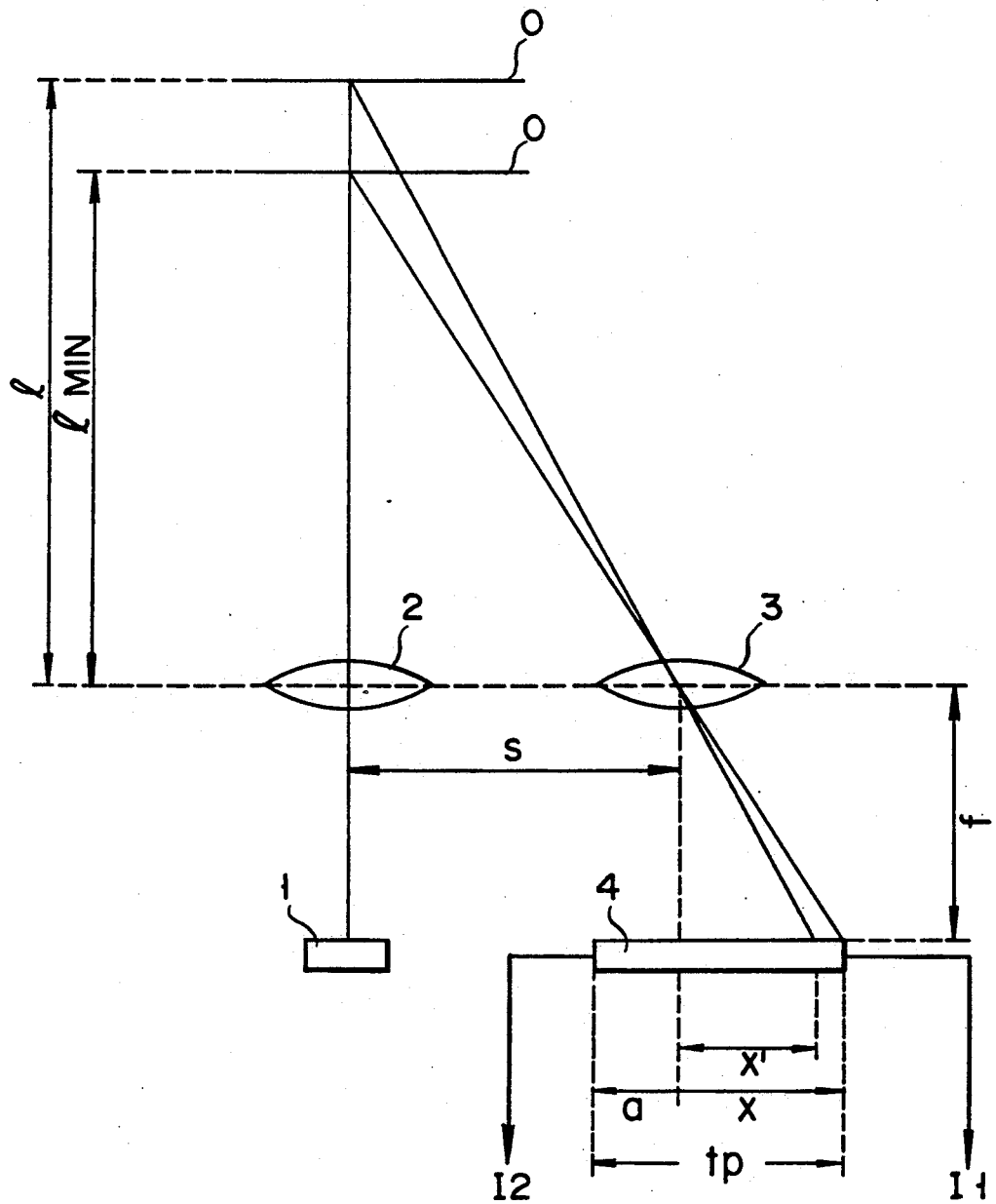
FIG. 7 is a view showing a conventional distance measuring system employing an active trigonometric distance measuring scheme.
Figure 8:
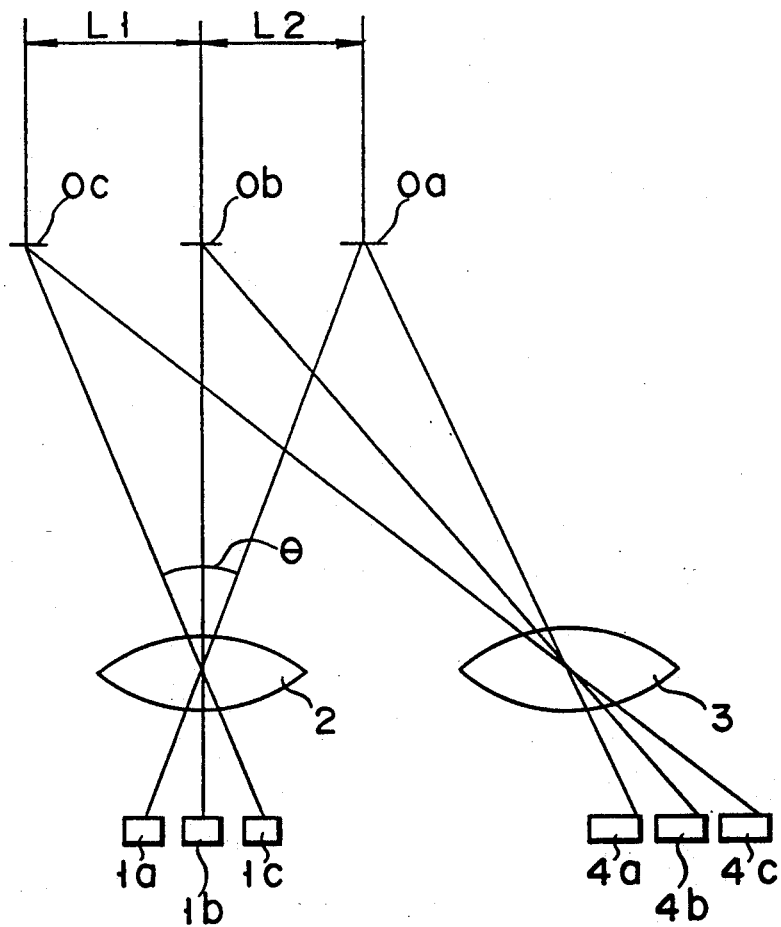
FIG. 8 is a view showing the principle of a conventional multi-point distance measuring apparatus.
Figure 9:
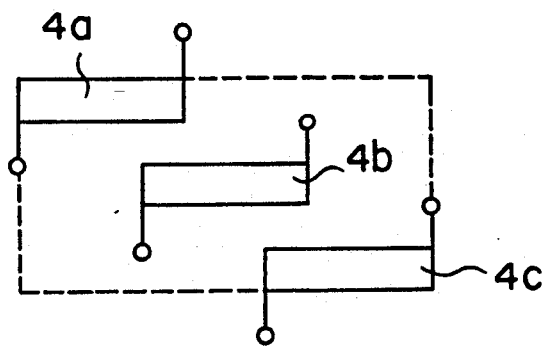
FIG. 9 is a view showing the layout of PSDs in the conventional multi-point distance measuring apparatus.

In the multi-point distance measuring apparatus of this embodiment, as will be described in the flow chart of FIG. 6, distance measurement is performed in the "center" mode in Table 1 in advance. As a result of this distance measurement, when it is determined that the object distance is long and distance measuring precision is not sufficiently high, distance measurement is performed in the "center:far-distance" mode. In this mode, a range between the electrodes 5e and 5f is selected as the light-receiving range of the PSD 5 (FIG. 3D).

In addition to a small amount of reflected signal light as a cause for decreasing the S/N ratio and degrading the distance measuring precision, another cause is high brightness or luminance of the ordinary light itself. When a current generated by ordinary light is large, distance measuring errors occur. In addition, when the current value exceeds a predetermined value, circuit saturation or the like occurs, and distance measurement may become impossible.

In the multi-point distance measuring apparatus of this embodiment, the amount of ordinary light is measured by the light-receiving element 11. When the discriminator 12 discriminates that the amount of ordinary light exceeds the predetermined value, distance measurement in the "center:far-distance" mode (Table 1) and the "high-brightness:near-distance" mode (Table 1) are sequentially performed, as will be described in the flow chart of FIG. 6, in order to minimize influences of ordinary light. In distance measurement of the "high-brightness:near-distance" mode, a range between the electrodes 5b and 5f is selected as the light-receiving range of the PSD 5 (FIG. 3E). The light-receiving ranges between the electrodes 5e and 5f and between the electrodes 5b and 5f are selected at the far and near distances, respectively, so that the light-receiving ranges are small, thereby minimizing influences of the ordinary light.

In order to perform distance measurement of an object at the nearest distance, the "center:macro" mode in Table 1 is selected. In this "center:macro" mode, the light-receiving range of the PSD 5 between the electrodes 5a and 5e is selected (FIG. 3F).

When the object distance is the nearest distance, since the magnitude of the signal current is sufficiently larger than the magnitude of the current generated by the ordinary light, a sufficiently high S/N ratio can be obtained even if the overall length $t_p$ of the selected light-receiving range is increased.

An apparatus for performing distance measurement by using a wide-range PSD is disclosed in U.S. Pat. No. 4,849,781 assigned to the same assignee of the present invention. According to the present invention, particularly, since the electrodes are arranged so that the light-receiving ranges overlap each other, the number of light-receiving ranges which can be selected is increased. An appropriate light-receiving range can be selected in accordance with the amount of ordinary light, the amount of signal light, the object distance, and the like, thereby improving arithmetic precision.

Since the states of the preamplifiers 7a to 7f are controlled in accordance with a selected light-receiving range, the arithmetic precision can be further improved.

Figure 4:
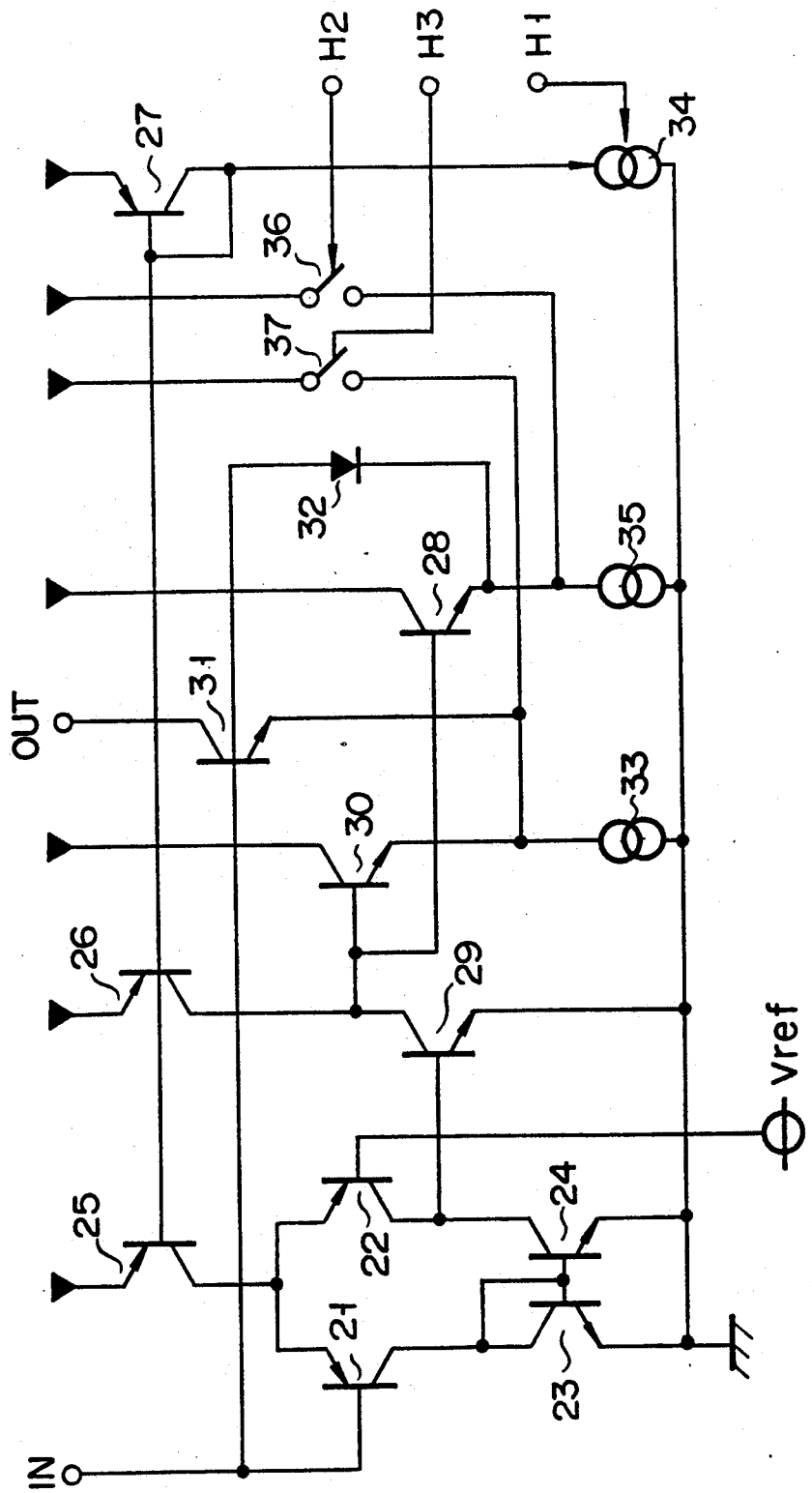
FIG. 4 is a circuit diagram showing internal connections in a preamplifier unit in FIG. 1.

The preamplifiers 7a to 7f will be described with reference to FIG. 4. FIG. 4 is a circuit diagram showing one of the preamplifiers 7a to 7f as a representative preamplifier. The arrangements of the preamplifiers 7a to 7f are identical to each other, as represented in FIG. 4. Referring to FIG. 4, reference numerals 21 to 31 denote transistors; 32, a diode; 33 to 35, current sources; and 36 and 37, switches.

When the switch 36 is ON and the switch 37 is OFF, the preamplifier performs low-impedance amplification control. This control will be described below.

Referring to FIG. 4, the transistors 21 to 24 constitute a differential amplifier. When the base potential of the transistor 21 is increased in response to a signal current input, the collector potential (i.e., an output from the differential amplifier) of the transistor 24 is increased. The transistors 26 and 29 constitute the next amplifier. When the collector potential of the transistor 24 of the above differential amplifier is increased, the collector potential of the transistor 29 as an output from the amplifier is decreased. The transistor 30 and the current source 33 constitute an output stage. The emitter potential of the transistor 30 is decreased with a decrease in collector potential of the transistor 29, thereby decreasing the emitter potential of the transistor 31. For this reason, the base potential of the transistor 31, i.e., a potential at an input terminal IN of the preamplifier is decreased. The input signal current flows in the base of the transistor 31 in a low-impedance state due to a feedback behavior. Therefore, a current having a value as a product of a current amplification factor ($h_{fe}$) and the signal current of the PSD 5 is absorbed from an output terminal OUT.

In order to perform low-impedance absorption control, the switch 36 is turned off, and the switch 37 is turned on. At this time, when the current source 34 is set ON, and the emitter potential of the transistor 31 is set higher than its base potential, the above feedback behavior is inhibited. In this case, a signal current input to the input terminal IN is discharged to ground through the diode 32, the transistor 28, and the current source 35, which latter two constitute the second output stage. Note that the switch 36 is arranged to control an ON/OFF operation of the second output stage.

In order to perform high-impedance control, both the switches 36 and 37 are turned off, and the current source 34 is also turned off. At this time, the preamplifier is set in an open state.

The switches SW1 and SW2, and the arithmetic unit 9 will be described with reference to FIG. 5. For illustrative convenience, only the terminal 8c of the switch SW1 and the terminal 8d of the switch SW2 ar illustrated in FIG. 5. Referring to FIG. 5, reference numerals 41 and 42 denote diodes; 43 to 53, transistors; 54 to 60, current sources; and 61, a capacitor.

A circuit consisting of the transistors 43, 44, and 45 and the current sources 54 and 55 constitutes a buffer. A circuit consisting of the transistors 46, 47, and 48 and the current sources 56 and 57, and a circuit consisting of the transistors 49, 50, and 51 and the current sources 58 and 59 also constitute buffers, respectively. The outputs of the preamplifiers 7c and 7d are connected to the diodes 41 and 42, respectively. Compressed potentials of the diodes 41 and 42 are input to these buffers. The transistors 52 and 53, the current source 60, and the capacitor 61 constitute the arithmetic unit 9. Of all the outputs of the buffers, the output of the switch SW1 is connected to the base of the transistor 52, and the output of the switch SW2 is connected to the base of the transistor 53.

Assuming that currents flowing through the diodes 41 and 42 are defined as $I_{41}$ and $I_{42}$, respectively, that a current from the current source 60 is defined as $I_\phi$, that collector currents of the transistors 52 and 53 are defined as $I_{52}$ and $I_{53}$, respectively, that a thermal voltage is defined as $V_T$, and that a reverse saturation current is defined as $I_S$, the following equation is established:

$$V_T \cdot \ln \frac{I_{41}}{I_S} - V_T \cdot \ln \frac{I_{42}}{I_S} = V_T \cdot \ln \frac{I_{52}}{I_S} - V_T \cdot \ln \frac{I_{53}}{I_S} \tag{7}$$

At this time, a base potential CH2 of the transistor 47 is set at low level, and the emitter potentials of the transistors 46 and 48 are pulled up. Under these conditions, the buffer consisting of the transistors 46, 47, and 48 and the current sources 56 and 57 is set in an OFF state. Therefore, the base potential of the transistor 53 is independent from the compressed potential of the diode 41.

The transistors 44 and 50 serve as switching transistors. When a base potential CH1 of the transistor 44 is set at high level, the compressed output from the diode 41 determines the base potential of the transistor 52 through an emitter follower consisting of the transistor 43 and the current source 54 and another emitter follower consisting of the transistor 45 and the current source 55.

Similarly, when a base potential CH3 of the transistor 50 is set at high level, the compressed output from the diode 42 determines the base potential of the transistor 53 through an emitter follower consisting of the transistor 49 and the current source 58 and another emitter follower consisting of the transistor 51 and the current source 59. In this manner, equation (7) is established. Equation (7) derives the following equation.

$$\frac{I_{41}}{I_{42}} = \frac{I_{52}}{I_{53}} \quad (8)$$

A relation of the currents $I_{52}$, $I_{53}$, and $I_\phi$ is defined as follows:

$$I_{52} + I_{53} = I_\phi \quad (9)$$

Equations (8) and (9) derive the following equation:

$$I_{52} = \frac{I_{41}}{I_{41} + I_{42}} I_\phi \quad (10)$$

When a current proportional to an output current of the PSD 5 flows across the diode 41 on the basis of equations (2) and (3), the following equation is established by equation (4):

$$I_{52} = \frac{I_\phi}{t_p}\left(a + \frac{S \cdot f}{l}\right) \quad (11)$$

In this manner, the current $I_{52}$ is a current proportional to a reciprocal, i.e., 1/l of the object distance. A voltage integrated by the capacitor 61 is also proportional to 1/l, and the reciprocal 1/l can be obtained from this voltage. This arithmetic operation is performed under the control of the CPU 13.

When the base potential CH2 is set at high level and the base potential CH1 is set at low level, the buffer consisting of the transistors 46, 47, and 48 and the current sources 56 and 57 is set in an ON state. On the other hand, the buffer consisting of the transistors 43, 44, and 45 and the current sources 54 and 55 is set in an OFF state. Therefore, the base potential of the transistor 53 is determined by the compressed potential of the diode 41. In this manner, in the switches SW1 and SW2 of this embodiment, the terminals 8a to 8f are switched in accordance with ON/OFF operations of the buffers.

Finally, a method of calculating the reciprocal 1/l from the voltage $V_{out}$ will be described below.

The voltage $V_{out}$ is defined as follows:

$$V_{out} = I_{52} \times t_{INT}/C_{INT} \quad \ldots (12)$$

where $t_{INT}$ is the time for charging the integrating capacitor $C_{61}$ with the current $I_{52}$ of equation (11), and $C_{INT}$ is the capacitance of the integrating capacitor $C_{61}$.

If equations (11) and (12) are combined and their constant components are defined as X and Y, then the following equation can be obtained:

$$V_{out} = \frac{X}{t_p}\left(a + \frac{Y}{l}\right) \quad (13)$$

and, therefore, the reciprocal 1/l is given as follows:

$$\frac{1}{l} = \frac{1}{t_p}\left(\frac{t_p}{X} \cdot V_{out} - a\right) \quad (14)$$

As shown in Table 2, the constants $t_p$ and a are changed in accordance with distance measurement setting states shown in Table 1, and the reciprocals 1/l can be accurately calculated by equation (14) in the respective states.

TABLE 2

|  | $t_p$ | a |
|---|---|---|
| Center | $t_{PC}$ | $a_C$ |
| Right | $t_{PR}$ | $a_R$ |
| Left | $t_{PL}$ | $a_L$ |
| Center: Far-Distance | $t_{PF}$ | $a_F$ |
| Center: Macro | $t_{PM}$ | $a_M$ |
| High-Brightness: near-Distance | $t_{PBV}$ | $a_{BV}$ |

A flow of distance measurement by a camera having a built-in distance measuring apparatus as described above is shown in FIG. 6. The IREDs, the preamplifiers, and the switches SW are set in accordance with Table 1. As shown in Table 2, by changing the constants $t_p$ and a, the reciprocal 1/l can be obtained at each point according to equation (14). A distance $l_{F1}$ in FIG. 6 is a predetermined distance for switching between the near-distance measurement and the far-distance measurement.

In a mode except for the high-brightness and macro modes, the nearest-distance measurement result from the center, right, and left positions is employed.

In this embodiment, the ON/OFF operations of the current source 34 for the preamplifiers 7a to 7f and the switches 36 and 37 allow high-impedance control, low-impedance absorption control, and low-impedance amplification control. The ON/OFF operations of the buffers for the switches SW1 and SW2 allow switching between the terminals 8a to 8f. Therefore, a signal current input to the arithmetic unit 9 can be selected.

As has been described in detail above, according to the present invention, there is provided an inexpensive multi-point distance measuring apparatus which has small minimum values of the nearest limit of the object distance and the distance measuring range and is capable of high-precision distance measurement.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims

What is claimed is:

1. A distance measuring apparatus for a camera, comprising:

light-emitting means having an array of a first light-emitting element for emitting light onto almost the center of an object to be photographed, a second light-emitting element for emitting light to the right side of the object, and a third light-emitting element for emitting light to the left side of the object;

a semiconductor position detection element, having a longitudinal direction aligned with that of the array of said first to third light-emitting elements, for receiving light reflected by the object upon radiation of light from each of said first to third light-emitting elements, said semiconductor position detection element being provided with first and second electrodes as left and right end electrodes, and a plurality of electrodes arranged between said first and second electrodes, said plurality of electrodes comprising a third electrode located near said first electrode, a fourth electrode located near said second electrode, a fifth electrode located near said third electrode between said third and fourth electrodes, and a sixth electrode located near said fourth electrode between said third and fourth electrodes;

a plurality of preamplifiers, connected to said first to sixth electrodes, for selectively performing high-impedance control, low-impedance absorption control, and low-impedance amplification control; switching control means comprising:

a) means for, when said semiconductor position detection element receives light emitted from said first light-emitting element and reflected by the object, performing the low-impedance amplification control of said preamplifiers connected to said third and fourth electrodes, the high-impedance control of said preamplifiers connected to said fifth and sixth electrodes, and the low-impedance absorption control of said preamplifiers connected to said first and second electrodes, b) means for, when said semiconductor position detection element receives light emitted from said second light-emitting element and reflected by the object, performing the low-impedance amplification control of said preamplifiers connected to said second and sixth electrodes, the high-impedance control of said preamplifier connected to said fourth electrode, and the low-impedance absorption control of said preamplifiers connected to said first, third, and fifth electrodes, and c) means for, when said semiconductor position detection element receives light emitted from said third light-emitting element and reflected by the object, performing the low-impedance amplification control of said preamplifiers connected to said first and fifth electrodes, the high-impedance control of said preamplifier connected to said third electrode, and the low-impedance absorption control of said preamplifiers connected to said second, fourth, and sixth electrodes; and arithmetic means for calculating an object distance in accordance with output currents from said preamplifiers of said plurality of preamplifiers, which are subjected to the low-impedance amplification control.

2. A distance measuring apparatus for a camera, comprising:

light-emitting means having an array of a first light-emitting element for emitting light onto almost the center of an object to be photographed, a second light-emitting element for emitting light to the right side of the object, and a third light-emitting element for emitting light to the left side of the object;

a semiconductor position detection element, having a longitudinal direction aligned with that of the array of said first to third light-emitting elements, for receiving light reflected by the object upon radiation of light from each of said first to third light-emitting elements, said semiconductor position detection element being provided with first and second electrodes as left and right end electrodes, and a plurality of electrodes arranged between said first and second electrodes, said plurality of electrodes comprising a third electrode located near said first electrode, a fourth electrode located near said second electrode, a fifth electrode located near said third electrode between said third and fourth electrodes, and a sixth electrode located near said fourth electrode between said third and fourth electrodes;

a plurality of preamplifiers, connected to said first to sixth electrodes, for selectively performing high-impedance control, low-impedance absorption control, and low-impedance amplification control; switching control means comprising:

a) means for, when said semiconductor position detection element receives light emitted from said first light-emitting element and reflected by the object, performing the low-impedance amplification control of said preamplifiers connected to said third and fourth electrodes, the high-impedance control of said preamplifiers connected to said fifth and sixth electrodes, and the low-impedance absorption control of said preamplifiers connected to said first and second electrodes, b) means for, when said semiconductor position detection element receives light emitted from said second light-emitting element and reflected by the object, performing the low-impedance amplification control of said preamplifiers connected to said second and sixth electrodes, the high-impedance control of said preamplifier connected to said fourth electrode, and the low-impedance absorption control of said preamplifiers connected to said first, third, and fifth electrodes, c) means for, when said semiconductor position detection element receives light emitted from said third light-emitting element and reflected by the object, performing the low-impedance amplification control of said preamplifiers connected to said first and fifth electrodes, the high-impedance control of said preamplifier connected to said third electrode, and the low-impedance absorption control of said preamplifiers connected to said second, fourth, and sixth electrodes, and d) means for, when distance measurement using said first light-emitting element is performed in a macro mode, performing the low-impedance amplification control of said preamplifiers connected to said first and fourth electrodes, the high-impedance control of said preamplifiers connected to said third, fifth, and sixth electrodes, and the low-impedance absorption control of said preamplifier connected to said second electrode; and arithmetic means for calculating an object distance in accordance with output currents from said preamplifiers of said plurality of preamplifiers, which are subjected to the low-impedance amplification control.

3. A distance measuring apparatus for a camera, comprising:

light-emitting means having an array of a first light-emitting element for emitting light onto almost the center of an object to be photographed, a second light-emitting element for emitting light to the right side of the object, and a third light-emitting element for emitting light to the left side of the object;

a semiconductor position detection element, having a longitudinal direction aligned with that of the array of said first to third light-emitting elements, for receiving light reflected by the object upon radiation of light from each of said first to third light-emitting elements, said semiconductor position detection element being provided with first and second electrodes as left and right end electrodes, and a plurality of electrodes arranged between said first and second electrodes, said plurality of electrodes comprising a third electrode located near said first electrode, a fourth electrode located near said second electrode, a fifth electrode located near said third electrode between said third and fourth electrodes, and a sixth electrode located near said fourth electrode between said third and fourth electrodes;

a plurality of preamplifiers, connected to said first to sixth electrodes, for selectively performing high-impedance control, low-impedance absorption control, and low-impedance amplification control;

a discriminator for generating an output when an object brightness value is not less than a predetermined value;

switching control means comprising:
a) means for, when said semiconductor position detection element receives light emitted from said first light-emitting element and reflected by the object, performing the low-impedance amplification control of said preamplifiers connected to said third and fourth electrodes, the high-impedance control of said preamplifiers connected to said fifth and sixth electrodes, and the low-impedance absorption control of said preamplifiers connected to said first and second electrodes,
b) means for, when said semiconductor position detection element receives light emitted from said second light-emitting element and reflected by the object, performing the low-impedance amplification control of said preamplifiers connected to said second and sixth electrodes, the high-impedance control of said preamplifier connected to said fourth electrode, and the low-impedance absorption control of said preamplifiers connected to said first, third, and fifth electrodes,
c) means for, when said semiconductor position detection element receives light emitted from said third light-emitting element and reflected by the object, performing the low-impedance amplification control of said preamplifiers connected to said first and fifth electrodes, the high-impedance control of said preamplifier connected to said third electrode, and the low-impedance absorption control of said preamplifiers connected to said second, fourth, and sixth electrodes, and
d) means for, when said discriminator generates the output, sequentially setting a mode for performing the low-impedance amplification control of said preamplifiers connected to said fourth and fifth electrodes, the high-impedance control of said preamplifier connected to said sixth electrode, and the low-impedance absorption control of said preamplifiers connected to remaining ones of said first to six electrodes, and a mode for performing the low-impedance amplification control of said preamplifiers connected to said third and fifth electrodes, and the low-impedance absorption control of said preamplifiers connected to remaining ones of said first to sixth electrodes; and arithmetic means for calculating an object distance upon reception of output currents from said preamplifiers of said plurality of preamplifiers, which are subjected to the low-impedance amplification control.

4. A distance measuring apparatus for a camera, comprising:
light-emitting means having an array of a first light-emitting element for emitting light onto almost the center of an object to be photographed, a second light-emitting element for emitting light to the right side of the object, and a third light-emitting element for emitting light to the left side of the object;

a semiconductor position detection element, having a longitudinal direction aligned with that of the array of said first to third light-emitting elements, for receiving light reflected by the object upon radiation of light from each of said first to third light-emitting elements, said semiconductor position detection element being provided with a plurality of current output terminals arranged from an end facing said array of said first to third light-emitting elements to an opposite end, said plurality of current output terminals comprising a first output terminal arranged at said end facing said array, and second, third, fourth, fifth, and sixth output terminals sequentially arranged from said first output terminal to said opposite end;

a plurality of preamplifiers, connected to said first to sixth current output terminals, for switching between high-impedance control and low-impedance control;

switching control means comprising:
a) means for, when said semiconductor position detection element receives light emitted from said first light-emitting element and reflected by the object, performing the low-impedance control of said preamplifiers connected to said second and fifth output terminals and the high-impedance control of said preamplifiers connected to said third and fourth output terminals located between said second and fifth output terminals,
b) means for, when said semiconductor position detection element receives light emitted from said second light-emitting element and reflected by the object, performing the low-impedance control of said preamplifiers connected to said first and third output terminals and the high-impedance control of said preamplifier connected to said second electrode located between said first and third output terminals, and
c) means for, when said semiconductor position detection element receives light emitted from said third light-emitting element and reflected by the object, performing the low-impedance control of said preamplifiers connected to said fourth and sixth output terminals and the high-impedance control of said amplifier connected to said fifth output terminal located between said fourth and sixth output terminals; and arithmetic means for calculating an object distance in accordance with output currents from said preamplifiers of said plurality of preamplifiers, which are subjected to the low-impedance control.

5. An active multi-point distance measuring apparatus comprising:
a light-emitting element array including a plurality of light-emitting elements for emitting distance measuring light to a plurality of points within a photographic frame;

a single optical position detection element having a longitudinal direction aligned with that of said light-emitting element array and arranged such that incident light moving ranges for the distance measuring light reflected by an object to be photographed are set to overlap each other, the incident light moving ranges being changed in accordance with an object distance, said optical position detection element being provided with a plurality of electrodes at ends of each of said moving ranges and being arranged to output a signal current representing a light-receiving position of the reflected light through a corresponding one of said electrodes;

a plurality of amplifiers connected to said plurality of electrodes, respectively, and having an amplification mode for amplifying the signal current, a cutoff mode for setting an input terminal in a high-impedance state to cut off the signal current, and a discharge mode for discharging the signal current to ground;

control means for selectively operating said plurality of light-emitting elements of said light-emitting element array, setting said amplifier connected to a given electrode located within a light-receiving range corresponding to the selected light-emitting element in the amplification mode, setting said amplifier connected to another given electrode outside the light-receiving range in the discharge mode, and setting said amplifier connected to still another given electrode located at an intermediate position within the light-receiving range in the cutoff mode; and distance arithmetic means for calculating the object distance by using outputs from said amplifiers set in said amplification mode.

6. An active multi-point distance measuring apparatus comprising:

a light-emitting element array including a plurality of light-emitting elements for emitting distance measuring light to a plurality of points within a photographic frame;

a single optical position detection element having a longitudinal direction aligned with that of said light-emitting element array and arranged such that incident light moving ranges for the distance measuring light reflected by an object to be photographed are set to overlap each other, the incident light moving ranges being changed in accordance with an object distance, said optical position detection element being provided with a plurality of electrodes at ends of each of said moving ranges and being arranged to output a signal current representing a light-receiving position of the reflected light through a corresponding one of said electrodes; and a distance arithmetic unit for calculating a distance to each object by using the signal current.

7. An apparatus according to claim 6, wherein said distance arithmetic unit includes switching means for causing to pass only the signal current output from said electrode within the incident light moving range corresponding to the ON light-emitting element.

8. An apparatus according to claim 6, wherein said distance arithmetic unit comprises a plurality of amplifiers connected to said electrodes and operated in one of an amplification mode for amplifying the signal current, a cutoff mode for setting an input terminal in a high-impedance state to cut off the signal current, and a discharge mode for discharging the signal current to ground, said amplifier connected to a given electrode within an incident light moving range corresponding to an ON light-emitting element is set in the amplification mode, said amplifier connected to another given electrode outside the incident light moving range is set in the discharge mode, and said amplifier connected to still another given electrode located at an intermediate position within the incident light moving range is set in the cutoff mode.

9. An active multi-point distance measuring apparatus comprising:

a light-emitting element array including a plurality of light-emitting elements for emitting distance measuring light to a plurality of points within a photographic frame;

a single optical position detection element having a longitudinal direction aligned with that of said light-emitting element array and arranged such that incident light moving ranges for the distance measuring light reflected by an object to be photographed are set to overlap each other, the incident light moving ranges being changed in accordance with an object distance;

said optical position detection element being provided with a plurality of electrodes at ends and intermediate positions of each of said moving ranges and being arranged to output a signal current representing a light-receiving position of the reflected light through a corresponding one of said electrodes;

a plurality of circuits connected to said plurality of electrodes, respectively;

said circuits being operated in one of a current output mode for outputting the current, a current cutoff mode for cutting off the current, and a current discharge mode for discharging the current to ground, one of the current output mode, the current cutoff mode, and the current discharge mode being set in accordance with a distance measuring mode; and arithmetic means for calculating an object distance by using an output current from said circuit of said plurality of circuits which is set in the current output mode.

10. An apparatus according to claim 9, wherein the distance measuring mode includes a mode for performing distance measurement of at least the center of a frame and a mode for performing distance measurement of a portion around the center of the frame.

11. An apparatus according to claim 10, wherein the distance measuring mode includes one of a macro distance measuring mode and a high-brightness distance measuring mode.

12. In a camera having a plurality of distance measuring modes, a distance measuring apparatus comprising:

a light-emitting element for emitting a distance measuring beam on an object to be photographed;

an optical position detection element for receiving light reflected by the object upon radiation of the distance measuring beam on the object, said optical position detection element being provided with a pair of main electrodes at two ends thereof, and a plurality of auxiliary electrodes equidistantly spaced apart between said two ends;

a plurality of preamplifiers, connected to said main and auxiliary electrodes, respectively, for selectively performing high-impedance control, low-impedance absorption control, and low-impedance amplification control;

control means for selecting two electrodes from said main and auxiliary electrodes to perform the low-impedance amplification control of said preamplifiers connected to said two selected electrodes, the high-impedance control of said preamplifier connected to said electrode located between said two selected electrodes, and the low-impedance absorption control of said preamplifier connected to said electrode located outside said two selected electrodes; and arithmetic means for calculating an object distance in accordance with a preamplifier output subjected to the low-impedance amplification control.

13. In a multi-point distance measuring camera capable of performing distance measurement at a plurality of points of an object to be photographed, a multi-point distance measuring apparatus comprising:

a light-emitting element array having at least two light-emitting elements for sequentially emitting a plurality of distance measuring beams to the object;

an optical position detection element having a longitudinal direction aligned with that of said light-emitting element array and located at a position where said optical position detection element can receive light reflected by the object, said optical position detection element having a pair of main electrodes located at two ends thereof and a plurality of auxiliary electrodes equidistantly spaced apart between said two ends;

a plurality of preamplifiers, connected to said main and auxiliary electrodes, respectively, for selectively performing high-impedance control, low-impedance absorption control, and low-impedance amplification control;

control means for selecting two of said main and auxiliary electrodes in accordance with a distance measuring point selected from the plurality of distance measuring points to perform the low-impedance amplification control of said preamplifiers connected to said two selected electrodes, the high-impedance control of said preamplifier connected to a given electrode located between said two selected electrodes, and the low-impedance absorption control of said preamplifier connected to another given electrode located outside said two selected electrodes; and arithmetic means for calculating the object distance in accordance with a preamplifier output subjected to the low-impedance amplification control.

14. A distance measuring apparatus for a camera, comprising:

a light-emitting element for emitting a distance measuring beam on almost the center of an object to be photographed;

a semiconductor position detection element for receiving the beam emitted from said light-emitting element and reflected by the object;

a divided signal current output electrode located at any position of said semiconductor position detection element and a pair of normal signal current output electrodes located at two sides of said divided signal current output electrode so as to form spaces between said divided signal current output electrode and said pair of normal signal current output electrodes;

a photometric circuit for measuring an object brightness value;

a discriminator for discriminating whether an output from said photometric circuit is not smaller than a predetermined brightness value; and arithmetic means for, when said discriminator discriminates that the object brightness value is not larger than the predetermined value, receiving output currents from said pair of normal signal output electrodes, for, when said discriminator discriminates that the object brightness value is not smaller than the predetermined value, sequentially receiving an output current from one of said pair of normal signal current output electrodes and an output current from said divided signal current output electrode, and an output current from the other of said pair of normal signal current output electrode and an output current from said divided signal current output electrodes, and for calculating an object distance on the basis of the input current values.

15. An apparatus according to claim 14, wherein switching means is connected to said divided signal current output electrode and said normal signal current output electrodes to switch between low-impedance control and high-impedance control.

* * * * *